US008648132B2

(12) United States Patent
Fleischer et al.

(10) Patent No.: US 8,648,132 B2
(45) Date of Patent: Feb. 11, 2014

(54) NANOCOMPOSITE METHOD OF MANUFACTURE

(75) Inventors: Cathy Fleischer, Rochester, NY (US); Michael Duffy, Rochester, NY (US); Robert J. Kress, Rochester, NY (US); John R. Hickman, North Canton, OH (US); Aaron Wagner, Rochester, NY (US)

(73) Assignee: NaturalNano, Inc., Pittsford, NY (US)

( * ) Notice: Subject to any disclaimer, the term of this patent is extended or adjusted under 35 U.S.C. 154(b) by 975 days.

(21) Appl. No.: 12/027,402

(22) Filed: Feb. 7, 2008

(65) Prior Publication Data

US 2008/0262126 A1 Oct. 23, 2008

Related U.S. Application Data

(60) Provisional application No. 60/888,685, filed on Feb. 7, 2007.

(51) Int. Cl.
*C08J 3/20* (2006.01)
*C08K 3/34* (2006.01)

(52) U.S. Cl.
USPC ............ 523/351; 523/200; 524/445; 264/299

(58) Field of Classification Search
USPC ............ 523/351, 200; 524/404, 445; 264/299
See application file for complete search history.

(56) References Cited

U.S. PATENT DOCUMENTS

| 3,059,379 | A | 10/1962 | Attoe |
| 3,488,166 | A | 1/1970 | Kovak et al. |
| 3,616,973 | A | 11/1971 | Hartley |
| 3,833,534 | A | 9/1974 | Tierney et al. |
| 3,971,749 | A | 7/1976 | Blunt |
| 4,019,934 | A | 4/1977 | Takayama et al. |
| 4,150,099 | A | 4/1979 | Robson |
| 4,364,857 | A | 12/1982 | Santilli |
| 4,434,075 | A | 2/1984 | Mardis et al. |
| 4,582,866 | A | 4/1986 | Shain |
| 4,591,485 | A | 5/1986 | Olsen et al. |
| 4,871,536 | A | 10/1989 | Arraudeau |
| 4,877,501 | A | 10/1989 | Schnur et al. |
| 4,887,622 | A | 12/1989 | Gueret |
| 4,889,885 | A | 12/1989 | Usuki et al. |
| 4,894,411 | A | 1/1990 | Okada et al. |
| 4,911,981 | A | 3/1990 | Schnur et al. |
| 5,039,338 | A | 8/1991 | Kondo et al. |
| 5,049,382 | A | 9/1991 | Price et al. |
| 5,133,590 | A | 7/1992 | Fitjer |
| 5,284,683 | A | 2/1994 | Erhan |
| 5,330,552 | A | 7/1994 | Rizzo |
| 5,385,776 | A | 1/1995 | Maxfield et al. |
| 5,462,798 | A | 10/1995 | Gueret |
| 5,492,696 | A | 2/1996 | Price et al. |
| 5,514,734 | A | 5/1996 | Maxfield et al. |
| 5,618,523 | A | 4/1997 | Zysman |
| 5,651,976 | A | 7/1997 | Price et al. |
| 5,705,191 | A | 1/1998 | Price |
| 5,718,841 | A | 2/1998 | Mardis et al. |
| 5,744,337 | A | 4/1998 | Price et al. |
| 5,747,560 | A | 5/1998 | Christiani et al. |
| 5,780,376 | A | 7/1998 | Gonzales et al. |
| 5,855,818 | A | 1/1999 | Gan et al. |
| 5,952,093 | A | 9/1999 | Nichols et al. |
| 5,980,871 | A | 11/1999 | Lukenbach |
| 6,013,206 | A | 1/2000 | Price et al. |
| 6,015,574 | A | 1/2000 | Cannell |
| 6,034,163 | A | 3/2000 | Barbee et al. |
| 6,036,765 | A | 3/2000 | Farrow et al. |
| 6,221,389 | B1 | 4/2001 | Cannell |
| 6,280,759 | B1 | 8/2001 | Price et al. |
| 6,401,816 | B1 | 6/2002 | Price |
| 6,414,070 | B1 | 7/2002 | Kausch et al. |
| 6,420,293 | B1 | 7/2002 | Chang et al. |
| 6,437,050 | B1 | 8/2002 | Krom et al. |
| 6,475,696 | B2 | 11/2002 | Majumdar et al. |
| 6,518,324 | B1 | 2/2003 | Kresta et al. |
| 6,548,159 | B2 | 4/2003 | Tsai et al. |
| 6,822,032 | B2 | 11/2004 | Gallucci |
| 6,838,508 | B2 * | 1/2005 | Hsiao et al. .................. 524/445 |
| 6,919,063 | B2 | 7/2005 | Jang et al. |
| 6,958,860 | B2 | 10/2005 | Dontula et al. |
| 7,046,439 | B2 | 5/2006 | Kaminsky et al. |
| 7,068,898 | B2 | 6/2006 | Buretea et al. |
| 7,078,452 | B2 | 7/2006 | Ebrahimian et al. |
| 7,115,282 | B2 | 10/2006 | Shefer et al. |
| 7,135,508 | B2 | 11/2006 | Chaiko et al. |

(Continued)

FOREIGN PATENT DOCUMENTS

| CN | 1673200 | 9/2005 |
| CN | 1746216 | 3/2006 |

(Continued)

OTHER PUBLICATIONS

The Prosecution History of U.S. Appl. No. 11/945,413 as of Sep. 28, 2010.
The Prosecution History of U.S. Appl. No. 11/697,490 as of Sep. 28, 2010.
The Prosecution History of U.S. Appl. No. 11/697,510 as of Sep. 28, 2010.
The Prosecution History of U.S. Appl. No. 12/126,035 as of Sep. 28, 2010.
The Prosecution History of U.S. Appl. No. 11/042,219 as of Sep. 28, 2010.
The Prosecution History of US Patent 7,400,490 as of Sep. 28, 2010.
The Prosecution History of U.S. Appl. No. 60/713,362 as of Sep. 28, 2010.
The Prosecution History of U.S. Appl. No. 60/717,533 as of Sep. 28, 2010.

(Continued)

*Primary Examiner* — Hannah Pak
(74) *Attorney, Agent, or Firm* — Duane C. Basch; Basch & Nickerson LLP

(57) ABSTRACT

Disclosed are systems and methods for the formation of a polymer nanocomposite material using a high-concentration masterbatch as a source of nanocomposite filler.

14 Claims, 6 Drawing Sheets

(56) References Cited

U.S. PATENT DOCUMENTS

| | | | |
|---|---|---|---|
| 7,400,490 B2 | 7/2008 | Gunderman et al. | |
| 7,679,883 B2 | 3/2010 | Gunderman et al. | |
| 7,888,419 B2 | 2/2011 | Cooper et al. | |
| 2001/0026802 A1 | 10/2001 | Price et al. | |
| 2002/0110686 A1 | 8/2002 | Dugan | |
| 2002/0142022 A1 | 10/2002 | Price et al. | |
| 2002/0151634 A1 | 10/2002 | Rohrbaugh et al. | |
| 2002/0156171 A1* | 10/2002 | Drewniak et al. | 524/445 |
| 2002/0160159 A1 | 10/2002 | McDonald | |
| 2002/0168509 A1 | 11/2002 | DeSimone et al. | |
| 2003/0039750 A1 | 2/2003 | Mao et al. | |
| 2003/0085132 A1 | 5/2003 | Cobley et al. | |
| 2003/0087103 A1 | 5/2003 | Belmares et al. | |
| 2003/0099798 A1* | 5/2003 | George et al. | 428/36.9 |
| 2003/0100653 A1 | 5/2003 | Chacko | |
| 2003/0100654 A1 | 5/2003 | Chheang et al. | |
| 2003/0191213 A1 | 10/2003 | Troutman et al. | |
| 2003/0205072 A1 | 11/2003 | Van Der Merwe | |
| 2004/0013597 A1 | 1/2004 | Mao et al. | |
| 2004/0030020 A1 | 2/2004 | Liang et al. | |
| 2004/0040834 A1 | 3/2004 | Smalley et al. | |
| 2004/0052957 A1 | 3/2004 | Cramer et al. | |
| 2004/0074778 A1 | 4/2004 | Cobley et al. | |
| 2004/0086656 A1 | 5/2004 | Kohl et al. | |
| 2004/0141932 A2 | 7/2004 | Kanji | |
| 2005/0038173 A1 | 2/2005 | Harris et al. | |
| 2005/0165151 A1 | 7/2005 | Fujiwara et al. | |
| 2005/0171265 A1 | 8/2005 | Bortnick et al. | |
| 2005/0227074 A1 | 10/2005 | Oyamada et al. | |
| 2005/0272846 A1 | 12/2005 | Price et al. | |
| 2006/0035087 A1 | 2/2006 | Yadav et al. | |
| 2006/0062840 A1 | 3/2006 | Price et al. | |
| 2006/0065537 A1 | 3/2006 | Barstad et al. | |
| 2006/0073335 A1 | 4/2006 | Oyamada et al. | |
| 2006/0089444 A1 | 4/2006 | Goodman et al. | |
| 2006/0102871 A1 | 5/2006 | Wang et al. | |
| 2006/0134362 A1 | 6/2006 | Lu et al. | |
| 2006/0142455 A1 | 6/2006 | Agarwal et al. | |
| 2006/0155012 A1 | 7/2006 | Riebel | |
| 2006/0163160 A1* | 7/2006 | Weiner et al. | 210/651 |
| 2006/0165926 A1 | 7/2006 | Weber | |
| 2006/0166810 A1 | 7/2006 | Gunderman et al. | |
| 2006/0183328 A1 | 8/2006 | Barstad et al. | |
| 2006/0193978 A1 | 8/2006 | Toth | |
| 2006/0196764 A1 | 9/2006 | Schoen et al. | |
| 2006/0240251 A1 | 10/2006 | Lunsford et al. | |
| 2006/0247332 A1 | 11/2006 | Coffey et al. | |
| 2006/0293430 A1 | 12/2006 | Wang et al. | |
| 2007/0106006 A1* | 5/2007 | Cooper et al. | 524/445 |
| 2007/0148457 A1 | 6/2007 | Wagner et al. | |
| 2007/0227351 A1 | 10/2007 | Garcia-Martinez | |
| 2007/0292459 A1 | 12/2007 | Cooper et al. | |
| 2008/0194406 A1 | 8/2008 | Price et al. | |
| 2008/0248201 A1 | 10/2008 | Corkery et al. | |
| 2008/0249221 A1 | 10/2008 | Corkery et al. | |
| 2009/0005489 A1 | 1/2009 | Daly et al. | |
| 2009/0326133 A1 | 12/2009 | Daly et al. | |
| 2010/0171081 A1 | 7/2010 | Gunderman et al. | |
| 2011/0086956 A1 | 4/2011 | Boscia et al. | |
| 2011/0160345 A1 | 6/2011 | Cooper et al. | |

FOREIGN PATENT DOCUMENTS

| | | |
|---|---|---|
| JP | 2000297179 | 10/2000 |
| WO | WO9848623 | 11/1998 |
| WO | WO2004106420 | 12/2004 |
| WO | WO2006127572 | 11/2006 |
| WO | WO2007011586 | 1/2007 |
| WO | WO2007048018 | 4/2007 |
| WO | WO2007142663 | 12/2007 |
| WO | WO2008045028 | 4/2008 |
| WO | WO2008104851 | 9/2008 |
| WO | WO2008112362 | 9/2008 |
| WO | WO2008124389 | 10/2008 |
| WO | WO2008124391 | 10/2008 |
| WO | WO2009002994 | 12/2008 |
| WO | WO2009029310 | 3/2009 |
| WO | WO2010056689 | 5/2010 |

OTHER PUBLICATIONS

The Prosecution History of U.S. Appl. No. 60/728,939 as of Sep. 28, 2010.
The Prosecution History of U.S. Appl. No. 60/867,369 as of Sep. 28, 2010.
The Prosecution History of U.S. Appl. No. 60/888,685 as of Sep. 28, 2010.
Du et al.; Preparation and Characterization of Polypropylene Grafted Halloysite and Their Compatibility Effect to Polypropylene/Halloysite Composite; Polymer Journal, vol. 38, No. 11, pp. 1198-1204 (2006) The Society of Polymer Science, Japan.
Messersmith et al.; Messersmith, P.; Giannelis, E.; Synthesis and Barrier Propeties of Poly(e-Caprolactone)-Layers Silicate Nanocomposites; J. Polym. Sci., Part A, Polym. Chem., 33, 1049 (1995).
An International Search Report and Written Opinion dated Jan. 30, 2009 for PCT/US2008/064640 which corresponds to U.S. Appl. No. 12/126,035.
An International Search Report and Written Opinion dated Mar. 4, 2010 for PCT/US2009/063950.
An International Search Report and Written Opinion dated Aug. 7, 2008 for PCT/US2008/059009 which corresponds to U.S. Appl. No. 11/697,490.
An International Search Report and Written Opinion dated Apr. 2, 2008 for PCT/US2006/034281 which corresponds to U.S. Appl. No. 11/469,128.
An International Search Report and Written Opinion dated Aug. 1, 2008 for PCT/US2008/059017 which corresponds to U.S. Appl. No. 11/697,510.
An International Search Report and Written Opinion dated Jun. 25, 2009 for PCT/US2008/068095 which corresponds to U.S. Appl. No. 12/145,525.
An International Search Report and Written Opinion dated Jul. 23, 2008 for PCT/US2006/035659 which corresponds to U.S. Appl. No. 11/531,459.
An International Search Report and Written Opinion dated May 7, 2007 for PCT/US2006/041208 which corresponds to U.S. Appl. No. 11/551,115.
The Prosecution History of U.S. Appl. No. 11/469,128 as of Nov. 16, 2010.
The Prosecution History of U.S. Appl. No. 11/531,459 as of Sep. 28, 2010.
The Prosecution History of U.S. Appl. No. 11/551,115 as of Sep. 28, 2010.
Baral et al. 'Electroless Metalization of Halloysite, a Hollow Cylindrical 1:1 Aluminosilicate of Submicron Diameter.' In; Chem. Mater., 1993, vol. 5, No. 9, pp. 1227-1232.
Price, R. In-Vitro Release Characteristics of Tetracycline HCl, khellin and Nicotinamide Adenine Dineculeotide from Halloysite; a Cylindrical Mineral, by R. Price et al., published in Journ. Microencapsulation, 2001, vol. 18, No. 6, p. 713-722.
Levis, S. et al.; Use of coated microtubular halloysite for the sustained release of diltiazem hydrochloride and propanolol hydrochloride; International Journal of Pharmaceutics; 253 (2003) 145-157.
Bergman, J.; Chen, H.; Giannelis, P.; Thomas, M., Coates, G.; Synthesis and characterization of polyolefin-silicate nanocomposites: a catalyst intercalation and in situpolymerization approach; Cornell University, Ithaca, NY 14853, US; Chem. Commun., 1999, 2179-2180.
Ash, B. et al.; Investigation into the Thermal and Mechanical Behavior of PMMA/Alumina Nanocomposites; Materials Research Society Symposium Proceedings, vol. 661, p. KK2 10.1-6 (2001).
Du, M. et al., Thermal Stability and Flame Retardant Effects of Halloysite Nanotubes on Poly(propylene); published in the European Polymer Journal, vol. 42, p. 1362-69 (2006).
Frost; Raman Microprobe spectroscopy of halloysite. Clays and Clay Minerals, 1997, vol. 45, No. 1, 66-72.

(56) References Cited

OTHER PUBLICATIONS

Gay et al.; C. Gay, L. Liebler; Theory of Tackiness; Physical Review Letters, 82 (5) 936-9 (1998).
Gregoriou, V.G.; Kandilioti, G.; Bolas, S.T.; Chain conformational transformations in sydiotactic polypropylene/layered silicate nanocomposites during mechanical elongation and thermal treatment; Polymer 46 (2005); 11340-50.
Wang et al.; Waterborne, Nanocomposite Pressure-Sensitive Adhesives with High Tack Energy, Optical Transparency, and Electrical Conductivity; Advanced Materials 2006, 18, 2730-2734.
Wang, X.; Li,Y.; Solution-based routes to transition-metal oxide one-dimensional nanostructures; Department of Chemistry, Tsinghua University, Beijing 100084, China; Pure Appl. Chem., vol. 78, No. 1, pp. 45-64, 2006; doi:10.1351/pac200678010045; c. 2006 IUPAC; pp. 1.
CAPlus Abstract of CN1746216.
Machine Translation JP2000297179.
Howlin et al.; Modelling of Interaction at the Composite Interface Between Aluminosilicate Nanotubes and Polymer Matrices; Book of Abstracts, 218the ACS National Meeting, New Orleans, Aug. 22-26, 1999.
Wagner et al.; Natural nanotubes enhance biodegradable and biocompatible nanocompsites. Industrial Biotechology. 2005. pp. 190-193.
Liu et al.; Properties of halloysite nanotube-epoxy resin hybrids and the interfacial reactions in the systems. Nanotechnology 2007, 18, 1-9.
Ye et al.; High impact strength epoxy nanocomposites with natural nanotubes. Polymer, 2007, 48, 6426-6433.
Gilman et al.; J.W. Gilman, C.L. Jackson, A.B. Morgan, R. Harris, E. Manias, E.P. Giannelis, M. Wuthenow, D. Hilton and S.H. Philips; Flammability properties of polymer-silicate nanocomposites; Chem. Mater.,12: 1866-1873 (2000).
Zanetti et al.;M. Zanetti, T. Kashiwagi, L.Falqui, G. Camino; Cone Calorimeter Combustion and Gasification Studies of Polymer Layered Silicate Nanocomposites; Chem. Mater., 14: 881-887 (2002).
Zanetti et al: M. Zanetti, G. Camino, C. Canavese, A.B. Morgan, F.G. Lamelas, C.A. Wilkie; Fire Retardant Halogen-Antimony-Clay Synergism in Polypropylene Layered Silicate Nanocomposites; Chem. Mater., 14. 189-193 (2002).
Birnbaum et al.; Linda S. Birnbaum and Daniele F. Staskal; Brominated Flame Retardants: Cause for Concern?; Environmental Health Perspectives, 112: 9-17 (2004).
Si et al.; M. Si; V. Zaitsev; M. Goldman; A. Frenkel; D.G. Peiffer; E. ; J.C. Sokolov; M.H. Rafailovich; Self-extinguishing polymer/organoclay nanocomposites; Polymer Degradation and Stability, 92, 86-93 (2007).
vanEsch; G.J. vanEsch; World Health Organization; Flame Retardants: A General Introduction, Environmental Health Criteria 192, (1997).
Osman et al.; M.A. Osman, M. Ploetze and U.W. Suter; Surface treatment of clay minerals; J. Mater. Chem., 13, 2359-2366 (2003).
Arkles; B. Arkles; Silane Coupling Agents: Connecting Across Boundaries; V2.0, copyright 2006.
An International Search Report and Written Opinion dated Feb. 7, 2008 for PCT/US2008/053270 which corresponds to U.S. Appl. No. 12/027,402.
Gao, F.; Clay/Polymer Composites: the story; MaterialsToday Nov. 2004; pp. 50-55.
The prosecution history between Sep. 28, 2010 and Jul. 6, 2011 for U.S. Appl. No. 12/126,035, filed May 23, 2008, published Dec. 31, 2009 as US-2009-0326133-A1; Inventor Daly, Robert et al.
The prosecution history between Nov. 16, 2010 and Jul. 6, 2011 for U.S. Appl. No. 11/469,128, filed Aug. 31, 2006, published May 10, 2007, issued Feb. 15, 2011 as US Patent 7,888,419; Inventors Cooper et al.
The prosecution history between Sep. 28, 2010 and Jul. 6, 2011 for U.S. Appl. No. 11/554,575, filed Oct. 30, 2006, published Aug. 30, 2007, as US-2007-0202061-A1; Inventor: Michael D. Riedlinger et al.
The prosecution history between and of U.S. Appl. No. 11/945,413, filed Nov. 27, 2007, published Apr. 14, 2011, as US-2011-0086956-A1; Inventor: B. Dillon Boscia et al.
The prosecution history between Sep. 28, 2010 and Jul. 6, 2011 for U.S. Appl. No. 11/697,490, filed Apr. 6, 2007, published Oct. 9, 2008, as US-2008-0249221-A1; Inventor: Robert W. Corkery et al.
The prosecution history between Sep. 28, 2010 and Jul. 6, 2011 for U.S. Appl. No. 11/697,510, filed Apr. 6, 2007, published Oct. 9, 2008, as US-2008-0248201-A1; Inventor: Robert W. Corkery et al.
The Prosecution History as of October 6, 2011 for U.S. Appl. No. 12/987,594, filed Jan. 10, 2011, Published Jun. 30, 2011, as US-2011-0160345-A1; Inventor: Sarah M. Cooper et al.
The File History as of Oct. 6, 2011 for U.S. Appl. No. 13/128,553, filed May 10, 2011, Published , as ; Inventor: B. Dillon Boscia et al.

\* cited by examiner

Tensile Testing of Molded Dogbones at 50mm per min as per ASTM D638.

| | Elastic Modulus (GPa) | Tensile Strength (MPa) | Elongation (%) |
|---|---|---|---|
| Nylon-6 (B3K) – No Filler | 1.5 | 80.3 | 67.1 |
| 92.5% Nylon-6 / 7.5% Halloysite (Ex. 3 - melt compounded) | 1.8 | 88.1 | 23.2 |
| 92.5% Nylon-6 / 7.5% Halloysite (Ex. 1 – let down using Masterbatch) | 1.91 | 88.3 | 63.6 |

ELEMENT INVENTORY

KNEADING BLOCKS
KB 45/5/42      1/4
KB 45/5/28      2/7
KB 45/5/20      0/7.5
KB 45/5/14      7/10
KB 45/5/14 LH   4/5
KB 90/5/28      3/8

FORWARDING
42/42           16/26
42/21           2/7
28/28           5/12
28/14           1/9.5
20/20           1/17.5
20/10           1/7
20/10 LH        4/6
14/14           0/2
42/42 SK        1/1
42/21 SKN       1/2
42 SF           0/2

SPACERS
PKR-10          1/1
PKR-1           0/3.5
TIPS            1/3

4 | #5 | #6 | #7 DIE | J-21 DIE

10/11
 42/21           21      898
 28/28           28
 KB 45/5/14      14      940
 KB 45/5/14      14
 KB 45/5/14      14      968
 KB 45/5/20      10      988
 20/10           10
 20/10 LH        42      1006
12 (90 mm VACUUM port)
 42/42           42      1020
                         1030
 42/42           42
13 (90 mm solid)
 42/42           42      1110  1114
 42/42           42
14 (90 mm solid)
 42/42           42      1198  1200
 42/21           21
 28/28           28      1261
 28/28           28
 20/20           20      1320
                         1290 flange
                         1317
 TIP                     1337
DIE

TO FIG. 4A

NANOCOMPOSITE METHOD OF MANUFACTURE

This application claims priority from U.S. Provisional Patent Application 60/888,685 for a "NANOCOMPOSITE METHOD OF MANUFACTURE," filed Feb. 7, 2007, by C. Fleischer et al., which is also hereby incorporated by reference in its entirety.

BACKGROUND AND SUMMARY

The following disclosure relates to a novel polymeric composite including a nanoparticle filler, and a process for making the composite using a masterbatch. More particularly, the disclosure provides a novel method for the production of a nanocomposite including a polymer and a halloysite nanoparticle filler, the filler having the general shape of a cylinder or rolled scroll-like element, in which the diameter of the cylinder is less than about 500 nm. The advantages of the nanoparticle filler (e.g., reinforcement, flame retardant, improved or equivalent mechanical performance) are provided as a result of the ability to disperse the nanoparticle within and/or on the surface of a polymeric structure.

The addition of various nano-clay materials to polymer systems can lead to improved mechanical properties (such as toughness/ductility, fatigue resistance or strength), improved processability and/or thermodynamic stability. Details of such advantages as well as alternative materials and their characteristics are found, for example, in several prior patent applications relating to halloysite nanocomposites and applications thereof, including U.S. patent application Ser. No. 11/469,128 for a "POLYMERIC COMPOSITE INCLUDING NANOPARTICLE FILLER," by S. Cooper et al., filed Aug. 31, 2006; U.S. application Ser. No. 11/531,459 for "Radiation Absorptive Composite and Methods for Production" filed Sep. 13, 2006 by A. Wagner et al.; and U.S. Provisional Application 60/867,369 for "POLYPROPYLENE NANOCOMPOSITE MASTER BATCH COMPOSITION AND METHOD OF MANUFACTURE," filed Nov. 27, 2006 by B. Dillon Boscia et al., the disclosures of all of the above-identified applications being hereby incorporated by reference in their entirety.

Composite materials have become well known as man-made materials are increasingly substituted for naturally occurring materials in construction, parts manufacture and the like (e.g., automobiles, building materials, food packaging and textiles). A polymer composite in this context includes at least one polymer matrix or material in combination with at least one particulate filler material. The polymer matrix material may be any of a number of polymers including themoplastics such as polyamide (Nylon), poly-urethane, polyolefins, vinyl polymers, and the like, thermosets, and elastomers. As structure-property relationships of composites become better understood, the use of nanoparticles is of increasing interest in the formation of composites—referred to as nanocomposites. Some of the most common nanoparticle fillers are two-dimensional nanoclays, one-dimensional carbon nanotubes, and zero-dimensional metal oxide nanoparticles such as Zinc Oxide (ZnO), Titanium Dioxide (Ti02), and Zirconia (ZrO). Composites offer the potential of materials having properties that are not often available in naturally occurring materials (e.g., U.S. Pat. No. 6,518,324 to Kresta et al. for a Polymer Foam Containing Nanoclay).

There are several known ways in which to form polymer nanocomposites utilizing nanoclay materials. These processes include melt compounding, precipitation, and utilization of a masterbatch. The following disclosure is directed, in one embodiment, to the use of a masterbatch as the means by which a polymer nanocomposite is produced. A masterbatch includes a high concentration of halloysite nanoparticles (e.g., up to 50% by weight of halloysite nanotubes), and is produced and then subsequently combined with neat polymer, for example in an extrusion or molding process, to form the final nanocomposite.

The advantages of using a concentrated masterbatch in the preparation of final nanocomposite materials, particularly those produced in accordance with the description below, are numerous. One advantage is that the final composite may exhibit better dispersion of the nanoparticles within the final material/product, further resulting in improved mechanical properties because of the more consistent dispersion. Defects in the final composite, due to poor dispersion, would lead to weak points in the final part formed, thus potentially compromising its mechanical properties. The nanotubes are well dispersed when the masterbatch is formed, making dilution to the final use composition for extrusion or molding an easy task. This two step process allows two opportunities to fully separate the tubes for maximum effectiveness. Also, making a concentrate limits the amount of polymer that must go through a separate compounding step and, therefore, reduces the operational cost of using the composite.

In melt compounding processes for nanomaterial fillers there is typically an upper limit to the amount of filler which can be incorporated. There is usually an increase in viscosity at high loading levels, resulting in high shear that will cause the polymer system to degrade to the detriment of the final mechanical properties. This requires high energy utilization and thus high cost, relative to standard polymer composite processing. For platy clays in particular the problem is made worse because the filler must be fully exfoliated during the extrusion process. Exfoliation requires the use of significant amounts of organic treatment agents that interfere with the polymer processing. In addition, to fully exfoliate and disperse a material such as a platy clay, a barrel length-to-diameter (L/D) ratio much greater than 40:1 is required and therefore necessitates specialized extrusion equipment.

For halloysite materials high concentrations of halloysite nanotube filler (e.g., HNT™ from NaturalNano, Inc.) are easily obtained for masterbatches for two reasons. First, the halloysite has already been processed to produce a primary particle that does not need to be exfoliated. Therefore, neither large amounts of organic additives are required nor unusual processing equipment or formulations. Second, the addition of the halloysite nanotubes does not produce significant increases in melt rheology and, in fact, for most polymers reduces the resistance to melt flow—producing a polymer composite formation process that is easier to run than simply melting the polymer itself. Composites made using the halloysite nanotube masterbatches (e.g. HNT™ from NaturalNano, Inc.) provide excellent ductility, elongation and fatigue resistance. By using a masterbatch, the material may also be provided in commercial quantities to facilitate use of the nanoparticle filler, yet avoiding inherent problems with handling clays (e.g., dusting).

Disclosed in embodiments herein is a method of producing a polymer nanocomposite, comprising: surface treating a nanofiller; forming a masterbatch by blending the nanofiller and polymer; forming particles (e.g., precipitate, pellets, flakes, etc.) of the masterbatch; dry blending masterbatch material with neat polymer to form a mixture; melt blending the mixture; and forming a final product using the melt-blended mixture.

Also disclosed in embodiments herein is a polymer nanocomposite masterbatch for letdown with a neat polymer, comprising: from about 5 wt % to about 50 wt % of a nanoparticulate filler (or about 5 wt % to about 60 wt %) and a polymer.

BRIEF DESCRIPTION OF THE DRAWINGS

FIG. 3 is a table that presents the tensile test (e.g., strength, modulus, and elongation) results for the nanocomposite of the disclosed invention, and two comparative examples; and FIGS. 4A-B are a diagram of the screw design for the melt compounding process to produce the Nylon-6 masterbatch.

Figure 1:
FIG. 1 is a scanning electron microscope (SEM) micrograph of a typical nanocomposite formed by the disclosed process which consists of 7.5% HNT in nylon 6.

The various embodiments described herein are not intended to limit the invention to those embodiments described. On the contrary, the intent is to cover all alternatives, modifications, and equivalents as may be included within the spirit and scope of the appended claims.

DETAILED DESCRIPTION

As more particularly set forth below, the disclosed compositions and methods for manufacture disclosed herein are directed to a masterbatch of high nanoparticle (e.g., nanotubular) concentration polymer additive, which is then further combined with a neat polymer to obtain a nanocomposite. The term "particulate" has been used herein in a general sense to represent an intermediate, concentrated form of nanocomposite, and includes, but is not limited to, pellets, flakes or powders as they may be formed from melt compounding or blending techniques and precipitates as they may be formed from blending techniques involving solvent blending and precipitation.

This present disclosure includes the description of a method for production of a polymer nanocomposite. The nanoclay material used for property enhancement is, in one of the disclosed embodiments, halloysite. Also disclosed herein, is a process for making a "masterbatch" of a high nanoparticle (e.g., halloysite) concentration with a polymer, such as nylon, polypropylene, or other melt processable polymer, to form a concentrated nanocomposite that can then be further compounded with the pure polymer to yield a final nanocomposite composition exhibiting superior properties. For example, the master or concentrated batch or composite is an intimate mixture of about 5 wt % to about 60 wt % of halloysite, preferably approximately 10% to about 40% by weight, and more preferably about 20% to about 30% by weight, of halloysite nanotubes, and approximately 40% to 95% by weight of polymer (based upon the range of preferable halloysite filler).

Typical let-down ranges for the concentrate to final nanocomposite (i.e., ratios of concentrated masterbatch material to neat polymer) are on in the range of about 1:1 up to about 1:10. The final nanocomposite that may be produced utilizing the masterbatch disclosed herein is likely to include between about 1 wt % to about 20 wt % halloysite nanotubes in polymer, preferably 5 wt % to 10 wt % halloysite in polymer. For example, to form a 5 wt % halloysite nanotube composite, 16.67% of a 30 wt % masterbatch could be melt blended with 83.33% of pure or neat polymer.

The masterbatch material is formed, in one embodiment, using a process that includes a solvent dissolution/mixing step, where a polymer such as polypropylene is dissolved in a solvent to produce a polymer solution. The polymer may include any material that may be dissolved by the solvent, including but not limited to themoplastics such as polyamides (Nylon), polyurethanes, polyolefins, vinyl polymers, and the like, thermosets, and elastomers, and more particularly including acrylic urethane latex, nylon, polyvinylpyrole, and acrylic latex polymers, polycarbonates, polyesters, polyvinyl chloride (PVC), polystyrenes and polypropylenes.

Added to the polymer solution is at least one dispersing aid or agent suitable for favorably affecting the dispersion of the halloysite in the polymer solution. The dispersing aid is typically a surfactant or compatibilizing agent, which has one functional group that is compatible with the solvent and/or polymer and one component that is compatible with the halloysite material. The dispersing agent may be selected from the group including, but not limited to, quaternary amines (quaternary compounds such as benzalkonium chloride (BAC)), silanes, titanates, organic acids, coupling agents and block co-polymers.

In one embodiment, the polymer is polypropylene, and the chemical compound is a quaternary ammonium compound (anhydrous or hydrated form) such as a surface affecting/treatment material (e.g., benzalkonium chloride (BAC)) added to the polymer solution.

A processed clay-based material, such as nanotubular halloysite, is then added to the polymer solution, to produce a composite solution, via agitation (e.g., sonic/ultrasonic), that is then suitable to be precipitated.

As will be appreciated, the nanoclay material (e.g., halloysite) may be treated using a dispersant or similar surface treatment. In addition to halloysite, alternative (layered or unlayered) inorganic clay materials may be employed, including but not limited to smectite, kaolin, boulangerite, and imogolite. The following examples suggest the use of benzalkonium chloride and/or benzylcetyl dimethylammonium chloride monohydrate in solvent as these materials have been demonstrated to permit the addition of up to approximately thirty-two times the mass of the BAC salt before flocculation occurs. In one example, 0.025 g BAC in 25 ml xylene is believed suitable to suspend up to about 0.785 g of halloysite clay, and twice the amount of BAC can suspend approximately twice the amount of clay. Up to flocculation, the clay finely disperses and suspends in the solvent (e.g., xylene) and remains in suspension in response to simple stirring or shaking.

Although various solvents may be employed, and depend upon the particular polymer being used for the masterbatch nanocomposite, the disclosed embodiments specifically contemplate the use of polypropylene (PP) as the polymeric material, and the use of xylene or tetrachloroethylene (TCE) as the solvents in which the material is dissolved. Preferably the solvent is chosen such that the solubility of the polymer is at least about 5% (at a temperature below the solvent boiling point and atmospheric conditions).

Another variable related to the solvent selection is the material into which the dissolved solution of polymer is to be introduced to cause precipitation. Alternatives that could be considered include any liquid that would not similarly act as a solvent for the polymer and which is miscible with the solvent used to dissolve the polymer. In the case of polypropylene, methanol and acetone were considered for use. As described in the examples below, methanol and acetone are believed particularly suitable for use with the polypropylene as the base polymer. These "non-solvents" preferably result in roughly immediate precipitation of the composite, are separable from solvent via distillation, and are easily removed from the resulting nanocomposite.

As will be appreciated, the precipitated material may be subsequently filtered, dried, or similar processed so as to produce the masterbatch material. After completion the masterbatch may be used in its highly-concentrated state, or may be further compounded with additional polymer material (virgin or reground/recycled) to produce a nanocomposite with a desired halloysite concentration and a satisfactory dispersion of halloysite in the nanocomposite.

The masterbatch, in an alternative embodiment, may be formed using a twin-screw extrusion process to produce a concentrated HNT polymer blend, typically 20-60 wt % HNT in polymer, and more preferably 30-50 wt % HNT in polymer.

After formation of the masterbatch, the final nanocomposite is formed through melt blending in an extrusion or molding process, such as a blown film molder, an injection molder or a single screw film extrusion process. Masterbatch pellets, flake or powder are, as one method contemplated herein, dry blended with neat polymer and fed into the molding or extrusion machine. A typical nanocomposite formed through this invention has 5-10 wt % nanofiller, so is formed through dry blending a 10-20 wt % masterbatch with 80-90 wt % neat polymer. Additional additives, such as compatibilizers, plasticizers, stabilizers, and the like, may be included in the blending operation.

It should be further appreciated that the halloysite nanotubes may be surface treated prior to incorporation in the masterbatch.

EXAMPLES

The practice of one or more aspects of the invention are illustrated in more detail in the following non-limiting examples:

Example 1

To make a nylon nanocomposite:

1. A commercial grade of Nylon-6 resin named Ultramid® B3K is obtained from BASF and dried at 85° C. under vacuum for 16 hours. In addition, Halloysite MP-SM1 material obtained from Imerys New Zealand China Clays is also placed in a vacuum oven at 110° C. for 16 hours.

Figure 4A:
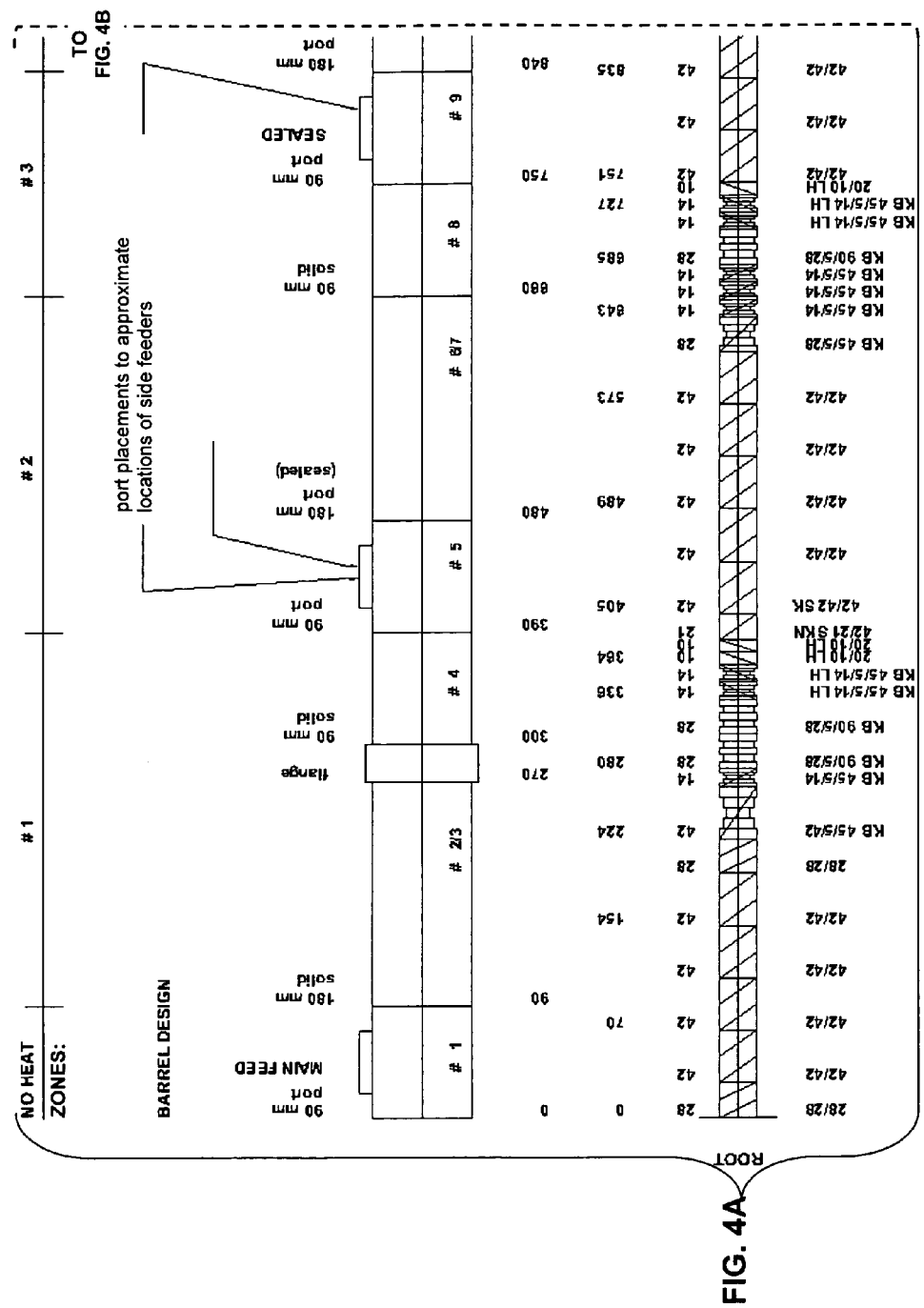

2. The dry Nylon-6 resin is fed at a controlled rate to a Werner and Pfleiderer ZSK-30 twin screw extruder operating at a 44:1 L/D ratio. The setup of this extruder is seen in FIGS. 4A-B, where the various zones are depicted and where KB illustrates kneading blocks interspersed within the screw extruder that intermixes the halloysite and the polymer. Temperatures in each of the extruder segments do not exceed 260° C. except for the die that is set to about 275° C. (dependent upon the polymer material being used).

3. A metered amount of Halloysite MP-SM1 is added to the extrusion process so as to result in a masterbatch of about 30% Halloysite by weight.

4. The molten extrudate is passed through a water bath to cool and excess water is removed via an air knife. The cooled extrudate is then cut in regular sized increments to result in a pelletized material.

5. The resultant HNT/nylon masterbatch may then be dry blended with neat Nylon-6, so that the final mixture contains about 7.5 wt % Halloysite.

6. Subsequently, the final mixture may be molded in an injection molder to form a nanocomposite material via standard nylon-6 molding temperatures, pressures, and times.

7. Tensile testing is conducted according to ASTM D638 standards.

Example 2

An alternative method for making a nanocomposite masterbatch is as follows (Yield approx. 26.25 g):

1. In a 2 liter beaker or glass reaction vessel, heat 500 ml mixed xylenes (e.g., mono or mixed isomers) with mild vortex stirring to about 115° C.

2. Dissolve 25 grams polypropylene (PP), such as ExxonMobil PP1024E4, into xylene, maintaining temperature and stirring, keeping boiling to a minimum. Depending on the size of PP particles (beads, powder, etc.), the time to complete dissolution varies from minutes to hours. Maintain approximate volume of solution by adding xylene as needed, or by refluxing.

3. Suspend and/or dissolve 0.39 g of benzalkonium chloride (BAC) in 25 ml xylene in a glass vial. Utilize either a horn sonicator or an ultrasonic bath for this purpose while maintaining constant room temperature.

4. Add 1.25 g of dried halloysite (Premium EG, NancoClay and Technologies, air milled and dried at 110° C.) to the 25 ml xylene/BAC mixture and pulse sonicate with a horn sonicator or ultrasonic bath.

5. Pour the contents of this vial (xylene, BAC and halloysite) into the hot stirring solution of PP and xylene. Rinse/shake the vial with xylene and add to solution.

6. Allow the mixture to stir for approximately 5-10 minutes to ensure homogeneity.

7. Prepare a vessel containing at least 500 ml of acetone or any other polypropylene non-solvent such as a low molecular weight anhydrous alcohol (methanol). The liquid should be stirred at an angle (or with baffles) with a high-torque stirrer.

Figure 2A:
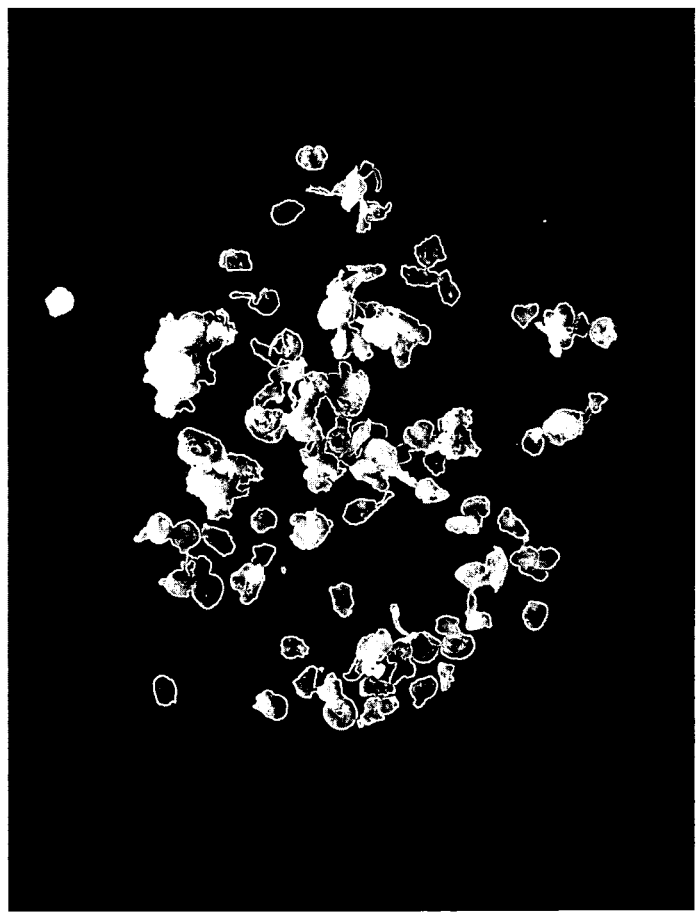
FIGS. 2A and 2B are, respectively, photographic representations of particles of a high concentration nanocomposite masterbatch produced in accordance with a disclosed embodiment, and an exemplary test piece formed using the nanocomposite masterbatch to blend a nanocomposite material.

8. Add the PP solution into the vessel of liquid slowly by either dropping or a slow stream and allow to stir for 10 min. The composite precipitates rather quickly and produces masterbatch particles such as those generally depicted in FIG. 2A.

9. Filter the precipitate over vacuum in a Büchner funnel. Rinse with fresh acetone three or more times, and allow to dry over vacuum for approximately 30 minutes.

10. Break up filter cake and place in a vented sparkless oven at 110° C. overnight.

Figure 2B:
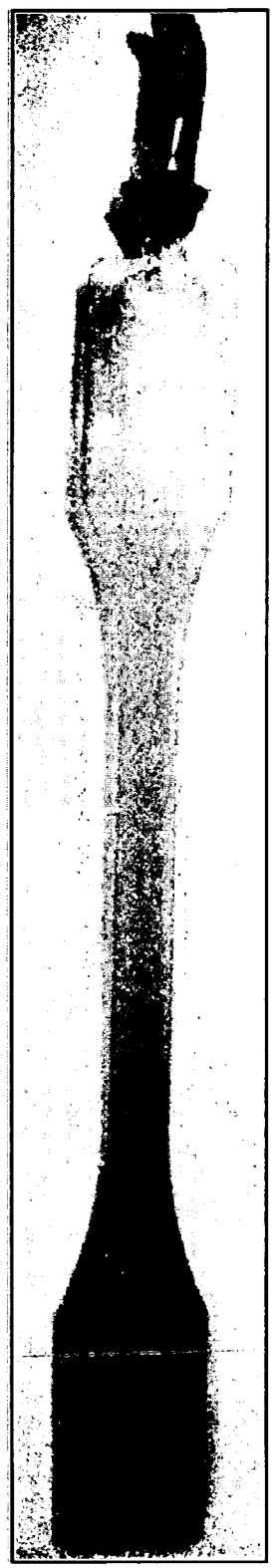

11. Pulverize material in a blade grinder or other such device and add to an injection molder for nanocomposite piece formation (e.g. test dog-bones as depicted in FIG. 2B). The results of mechanical testing, as set forth above are believed relevant to this example as well.

Example 3

Comparative—Melt Compounded

To make a nylon nanocomposite using melt compounding:

1. A commercial grade of Nylon-6 resin named Ultramid® B3K is obtained from BASF and dried at 85° C. under vacuum for 16 hours. In addition, Halloysite MP-SM1 material obtained from Imerys New Zealand China Clays is also placed in a vacuum oven at 110° C. for 16 hours.

2. The dry Nylon-6 resin is fed at a controlled rate to a Werner and Pfleiderer ZSK-30 twin screw extruder operating at a 44:1 L/D ratio. The setup of this extruder is seen in FIG. 4. Temperatures in each of the extruder segments do not exceed 260° C. except for the die that is set to 275° C.

3. A metered amount of Halloysite MP-SM1 is added to the extrusion process so as to result in a compound of about 7.5% Halloysite by weight.

4. Subsequently, the compound may be molded in an injection molder to form a nanocomposite material via standard nylon-6 molding temperatures, pressures, and times.

Test Results: As depicted in the table of FIG. 3, a nanocomposite material prepared using a masterbatch for blending with un-filled or neat material exhibits significantly improved mechanical performance (see e.g., elongation for material in row 3) when compared to directly-blended nanocomposites (e.g., as depicted in row 2 corresponding to Example 3 above). It is believed that the improvement in elongation arises as a result of the ability to more homogeneously disperse the nanoparticles within and/or on the surface of a polymeric structure. As a result of the information set forth in the table of FIG. 3, it is believed that the HNT nanocomposite prepared by blending a high-concentration masterbatch with a neat material will exhibit not only the improved mechanical performance anticipated from the addition of the nanoparticles (e.g., Example 1 product illustrates improved elastic modulus and tensile strength like Example 3), but will not experience the reduction in elongation attributed to poor dispersion in the composite material—and thereby approaches the elongation of the unfilled (neat) polymer.

It will be appreciated that various of the above-disclosed embodiments, examples and other features and functions, or alternatives thereof, may be desirably combined into many other different systems or methods. Also, various presently unforeseen or unanticipated alternatives, modifications, variations or improvements therein may be subsequently made by those skilled in the art which are also intended to be encompassed by the following claims.

What is claimed is:

1. A method of producing a polymer nanocomposite, comprising:
    surface treating a nanofiller, including a nanotubular material, to produce a surface-treated nanofiller;
    forming a masterbatch by blending the surface-treated nanofiller and polymer;
    forming particles of the masterbatch by solvent precipitation operation to prepare a masterbatch material;
    dry blending the masterbatch material with neat polymer to form a mixture;
    melt melting the mixture and
    forming a final product using the melt-blended mixture.

2. The method of claim 1, wherein said surface-treated nanofiller material includes:
    clays;
    carbon; and
    cellulose fibers.

3. The method according to claim 1, wherein said polymer is selected from the group consisting of: thermoplastics, polyurethanes, polyolefins, vinyl polymers, thermosets, elastomers, acrylic urethane latex, nylon, polypyrrole, acrylic latex polymers, polycarbonates, polyester, polyvinylchloride, polystyrenes and polypropylenes.

4. The method according to claim 1, wherein a dispersing agent is used for surface treatment of the nanofiller, said dispersing agent selected from the group consisting of quaternary ammonium salts, silanes, titanates, organic acids, coupling agents, and block co-polymers.

5. The method according to claim 1, wherein forming a masterbatch includes melt compounding the surface-treated nanofiller and polymer to form the particles of the masterbatch.

6. The method according to claim 5, wherein melt compounding includes twin-screw extrusion.

7. The method according to claim 5 melt compounding includes single screw extrusion.

8. The method according to claim 1, further comprising forming the nanocomposite material using a forming processes selected from the group consisting of: molding, compounding, extrusion, co-extrusion, rotomolding, thermoforming, vacuum forming, calendaring, matched-die molding, hand lay-up, filament winding, casting, and forging.

9. The method according to claim 1 in which dry blending the masterbatch material with neat polymer includes blending at least about 5% masterbatch with a balance of neat polymer.

10. The method according to claim 1 in which dry blending the masterbatch material with neat polymer includes blending up to about 50% masterbatch with a balance of neat polymer.

11. The method according to claim 1 wherein the surface-treated nanofiller includes halloysite and where the final product using the melt-blended mixture exhibits mechanical strength greater than an unfilled polymer while exhibiting an elongation substantially equal to the unfilled polymer.

12. The method according to claim 1, wherein forming the masterbatch by blending the surface-treated nanofiller and polymer includes using halloysite as the nanofiller where the percentage of halloysite in the masterbatch is from about 5 wt % to about 60 wt %.

13. The method according to claim 1, wherein forming a masterbatch includes solvent dissolution and mixing, where the polymer is dissolved in a solvent to produce a polymer solution and then a dispersing agent is added to aid the dispersion of the nanotubular material in the polymer solution and the polymer solution including the nanotubular material is then mixed.

14. The method according to claim 13, wherein forming particles of the masterbatch includes introducing the mixed polymer solution into a liquid that is miscible with the solvent to induce precipitation of particles of the masterbatch.

* * * * *